Aug. 16, 1938.   J. SCHAAF   2,127,270
METHOD OF MAKING SEWAGE SCREENS
Filed Aug. 25, 1936   2 Sheets-Sheet 1
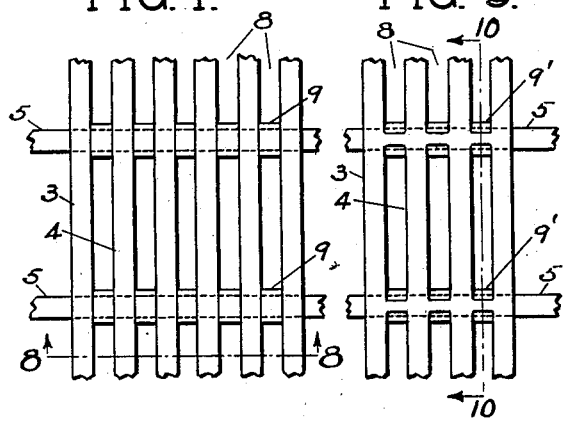
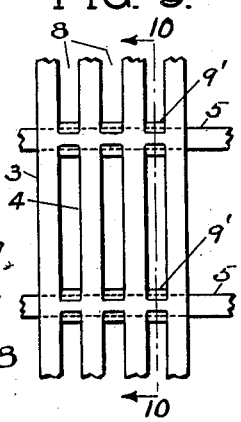
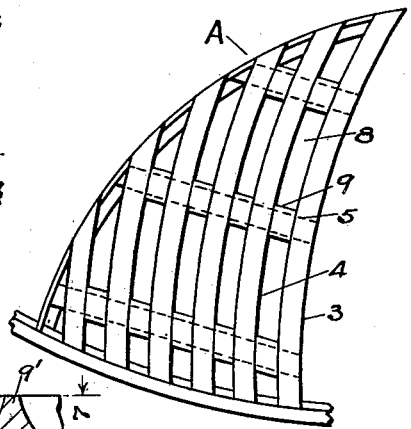
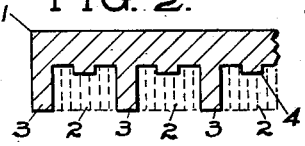
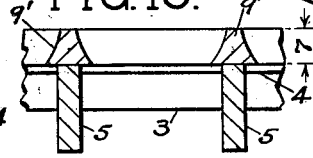
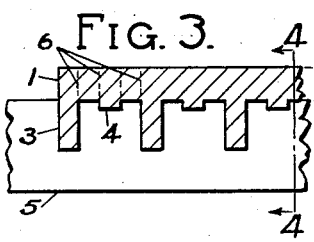
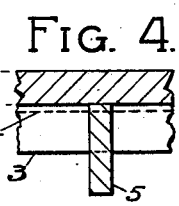
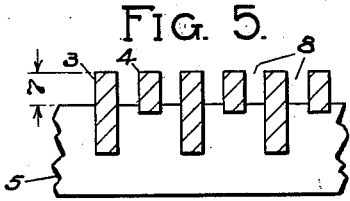
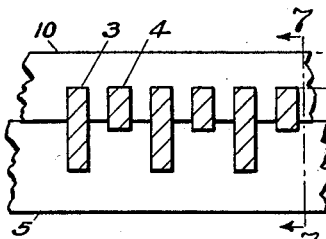
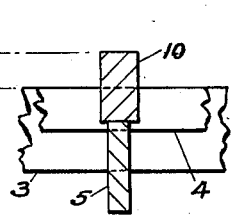
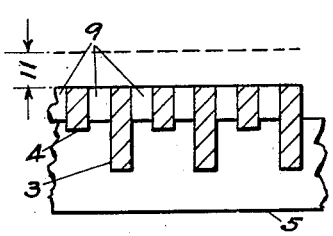
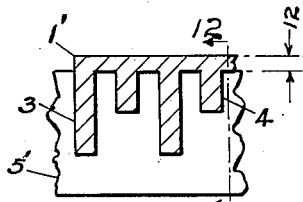
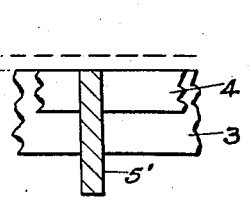
INVENTOR
John Schaaf
BY
Lucian B. Jackson
ATTORNEY

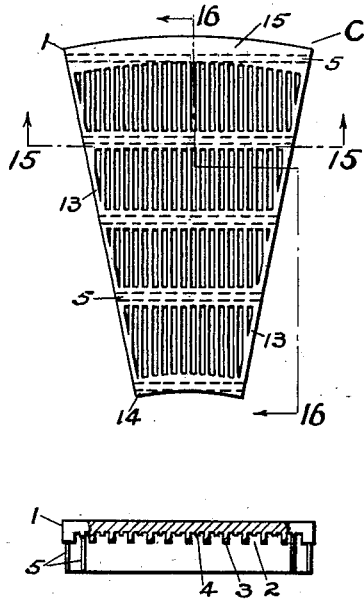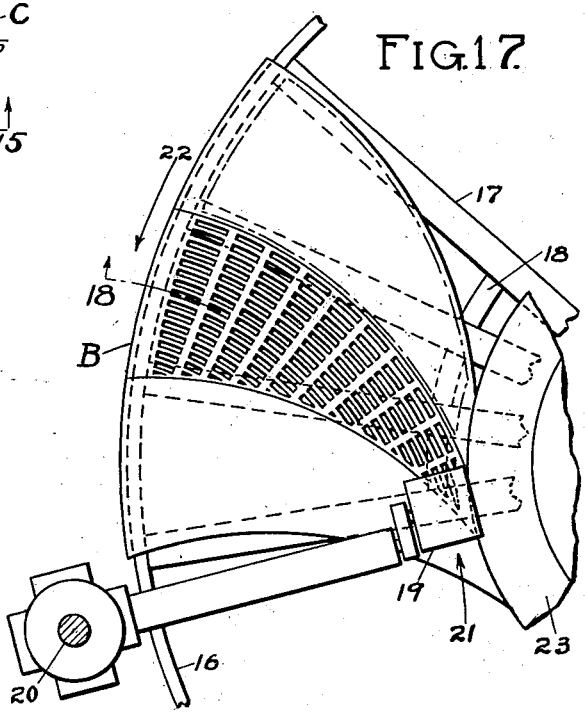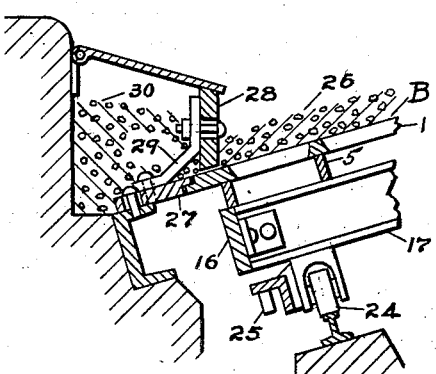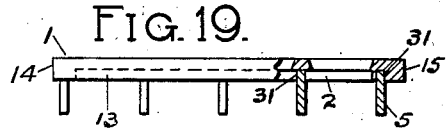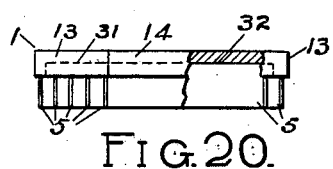

Patented Aug. 16, 1938

2,127,270

UNITED STATES PATENT OFFICE 2,127,270

METHOD OF MAKING SEWAGE SCREENS

John Schaaf, Buffalo, N. Y.

Application August 25, 1936, Serial No. 97,787

6 Claims. (Cl. 29—163.5)

This invention relates to a screen for the screening of sewage in which the solids are separated from the liquid by retaining the solids on said screen and allowing the liquid to pass through, and particularly to the method of manufacturing said screen.

The type of screen to which this invention particularly applies is a flat disk screen mounted for rotation and built up of similar segments to form the complete screen. The screen portion illustrated in the drawings shows parts of a screen segment which may be formed with straight parallel ribbons as in Figure 14 to be mounted radially in the complete screen or a screen segment of sector shape which may be formed with curved ribbons as in Figs. 13 and 17 and the screen segments supported on a frame as in Figs. 17 and 18.

Screen segments have heretofore been formed from a solid plate as set forth in the patent to D'Olier et al. No. 1,631,585 or as shown in the patents to D'Olier Nos. 1,610,431 and 1,717,313 in which the screen segment is built up of separate ribbons or strips to give increased flow therethrough in proportion to the area of the screen. The open area of the former, or plate type is about 20% of the total plate area, while the open area of the two latter, or ribbon type, is about 40% of the total area with $\frac{1}{32}$ inch slots.

The original conception and development of a solid plate as a screen member was to form slots in said plate but of such a distance apart as to maintain sufficient strength in a comparatively thin plate. To increase the open area of a so-called single slot, from 18% of the total plate area, the twin slot of D'Olier Patent No. 1,631,585 was devised which increased the open area to 23%. To maintain sufficient strength of the plate the slots were comparatively short and staggered with overlapping and parallel twin slots across the plate. The weak section of this plate was through the center in a direction parallel with the slots and to prevent sagging the slots were widely spaced between groups.

In a screen as shown in the two patents of ribbon type, the strips or ribbons are of suitable material to resist wear and corrosion, as Monel metal, and spaced apart, as $\frac{1}{32}$" to $\frac{3}{32}$" as desired, and in parallel relation to each other. The ribbons are of suitable length and generally rectangular in section of about $\frac{1}{32}$" in thickness and $\frac{3}{16}$" or $\frac{1}{4}$" in depth and placed on edge across suitable bars which are slotted to receive the lower edge of each ribbon. Each ribbon is then driven into each cross bar.

Where the screen segment is made up of separate strips it is found that there is not an equal tension on each strip. In other words some strips are looser between supports than others after being fabricated and the slots then vary by the looser strips being pushed out of alignment when the brushes pass over them, and being pushed out of alignment have a tendency to become set and not return to their original position to maintain equally spaced slots.

The process of manufacture in using separate strips as above described and which I have employed is a very slow and laborious one and of such an intricate nature in separately handling and fabricating each separate strip as to take an excessive amount of time and make a screen extremely expensive.

In my present construction when the ribbons are formed, as hereafter described, from a single plate an equal tension is maintained on all ribbons. The lower part of the ribbons being first formed and then welded to cross reenforcing bars before finishing the tops of the ribbons this equal tension is always maintained. This holds true when the ribbons are completely separated their entire length from the plate as described in connection with Figs. 1 to 8 as well as when the ends of the ribbons and their intermediate spacers are never completely separated.

One object of this invention is to produce a simplified and strong screen with an improved method of manufacture and fabrication as to greatly reduce the cost of production.

Another object is to produce from a solid plate a screen which has an open area of better than 40% with a $\frac{1}{32}$" width slot and considerably more with a wider slot.

Further objects and features of the invention will be best and more fully understood from the following detailed description of typical applications and forms of the invention, throughout which description reference is had to the accompanying drawings in which:

Figure 1 is a plan of a portion of a segment of a screen as finished and showing straight parallel ribbons with spacers and reenforcing or supporting bars.

Fig. 2 is a transverse section of a portion of a plate milled on the bottom, as shown by vertical dotted lines, to form the lower parts of parallel ribbons.

Fig. 3 is a view as in Fig. 2 with the addition of a side elevation of a supporting bar inserted into the partially formed ribbons of Fig. 2.

Fig. 4 is a section on line 4—4 of Fig. 3.

Fig. 5 is a view as in Fig. 3 with the plate milled above the supporting bar to complete the ribbons.

Fig. 6 is a view as in Fig. 5 with the addition of a side elevation of a spacing bar above the supporting bar.

Fig. 7 is a section on line 7—7 of Fig. 6.

Fig. 8 is a view as in Fig. 6 but with the spacing bar milled off flush with the top of the ribbons and shows a transverse section of a portion of a completed screen as on line 8—8 of Fig. 1.

Fig. 9 is a plan of a portion of a screen segment similar to that of Fig. 1 but with the spacers formed integral with the ribbons.

Fig. 10 is a longitudinal section on line 10—10 of Fig. 9.

Fig. 11 is a transverse section of a portion of a plate showing ribbons milled their entire depth and a supporting bar set into and across said ribbons.

Fig. 12 is a section on line 12—12 of Fig. 11 with the plate milled off flush with the top of the supporting bar to complete the ribbons.

Fig. 13 is a complete screen segment formed according to my invention but with the ribbons curved as in D'Olier Patent 1,610,431.

Fig. 14 is a plan of a complete screen segment formed in a manner detailed in Figs. 9 and 10.

Fig. 15 is a transverse section on line 15—15 of Fig. 14.

Fig. 16 is a side elevation partly in section on line 16—16 of Fig. 14.

Fig. 17 is a plan of a portion of a disk screen with three segments of sector shape and a portion of the supporting framework and with one cleaning brush, one of the segments showing the ribbons.

Fig. 18 is a section on line 18 of Fig. 17 and showing a wearing ring at the periphery of the screen, filtering material and method of supporting the screen.

Fig. 19 is a view as in Fig. 16 to show a solid border.

Fig. 20 is a view as in Fig. 15, but with a partial section on line 15—15 of Fig. 14, to show solid border and reenforcing bar.

In the present invention, a flat plate 1 (Fig. 2) of suitable material, as Monel metal, bronze, Everdur or the like and of the desired outline shape, as segment C of Fig. 14, is first milled by a gang miller to remove the material indicated by the vertical parallel dotted lines at 2, and form the lower parts of ribbons 3 and 4. A deep ribbon 3 alternates with a shallow ribbon 4 to provide clearance spaces 2 between the lower parts of ribbons 3. Milling out the portions at 2 on one side of plate 1 (Fig. 2) and the full length as in Figs. 15 and 16, or the total length of ribbons inside the border as in Figs. 19 and 20, relieves the plate of any internal strain so the ribbons will have an equal tension with no tendency to warp out of shape when completed as described hereafter.

5 is a reenforcing or supporting bar having slots milled across it and of the same shape as the lower parts of ribbons 3 and 4 as shown in Fig. 2. Bar 5 is pressed onto and across the ribbons milled from the bottom of the plate 1, to support and reenforce the said ribbons 3 and 4 as shown in Fig. 3.

Reenforcing bars 5 are spaced two or three inches apart, more or less, as desired across the bottom of plate 1 as indicated in Fig. 1, and fastened to each ribbon where contact is made by suitable means as welding, sweating or the like. This greatly stiffens the plate and incorporates the bars and ribbons which are completed in the next operation without separate handling of each ribbon.

A gang miller is now operated to mill the top of plate 1 on the dotted lines 6 of Fig. 3 down flush with the top of supporting bars 5 to complete the ribbons 3 and 4 as in Fig. 5. The depth of the milling on dotted lines 6 in Fig. 3 to form the tops of the ribbons 3 and 4 is indicated by the numeral 7. The ribbons now are completely formed parallel with each other and spaced apart with the desired uniform spacing 8 between them.

Where the outline shape of the segment permits, the use of a gang miller is preferred to form the ribbons but it will be understood that where necessary, a single miller to cut each slot separately may be used. The clearance spaces 2 (Fig. 2) and the spaces 8 between the ribbons 3 and 4 (Fig. 5) are formed the entire length of plate 1 to make a screen segment with ribbons the entire length of said segment. Fig. 13 shows a complete segment A with curved ribbons thus formed and mounted similar to segments of D'Olier Patent 1,610,431.

In my method of construction I now space the tops of the ribbons 3 and 4 above each supporting bar 5 by spacers 9 as in Fig. 8. To form these spacers 9, I provide a spacing bar 10 having slots milled across it of the same shape as the upper part of ribbons 3 and 4 as in Fig. 5. Spacing bar 10 is pressed over the upper portion of ribbons 3 and 4 and down on to each supporting bar 5 (Fig. 6). The bars 10 are fastened to each ribbon 3 and 4 and supporting bar 5 where contact is made with said ribbons and bar by suitable means as by welding. The portion of the spacing bars 10 above the ribbons 3 and 4 (indicated by the numeral 11 in Figs. 6, 7 and 8) is now milled off flush with the tops of said ribbons to complete the screen segment, the portion of which is shown in Figs. 8 and 1.

The spacing bar 10 is thicker than the supporting bar 5 as indicated in Fig. 7, as it is desirable to provide clearance toward the bottom of the screen to keep the slots clear at all times. The side clearance, or the clearance between the ribbons at the bottom, is provided for by alternating deep and shallow ribbons to leave the clearance spaces 2 above described.

The portion of a finished segment shown in Figs. 9 and 10 is the same as in Fig. 1 except that the spacers 9' are formed integral with the ribbons 3 and 4. To form a segment as in Figs. 9 and 10 the plate 1 is milled on the bottom as in Fig. 2 to form the lower parts of ribbons 3 and 4 the full length of the plate. The supporting bars 5 are now pressed onto ribbons 3 and 4 and welded as in Fig. 3. The tops of ribbons 3 and 4 are now formed by milling a depth 7 on dotted lines 6 to the tops of bars 5 as in Fig. 3, but instead of milling the slots 8 the entire length as in Fig. 5, the slots 8 are milled only between the spacers 9' as in Figs. 9 and 10.

The screen segment C, finished as just described, is shown in Fig. 14 with a section on line 15—15 as in Fig. 15 and a section on line 16—16 as in Fig. 16. The plate 1 in Figs. 14, 15 and 16 is milled so as to form an unbroken border, on its upper surface, comprising the two radial sides 13 and the ends 14 and 15. The ends of all ribbons 3 and 4 are thus formed integral with the plate above the clearance spaces 2 and prevents the ends of said ribbons from breaking away and curling up as sometimes happens with ribbons which end as in Fig. 13. The segment C then has a continuous upper surface with a maximum open area and with the supporting bars built in to give it the proper depth, it has maximum strength.

As shown in Figs. 19 and 20, the clearance spaces 2 between the ribbons 3 and 4 are formed on the bottom of plate 1 only over the portion occupied by said ribbons so these clearance spaces are not cut through the border sides 13 or the ends 14 and 15 as shown in Figs. 15 and 16. Also as shown in Figs. 19 and 20 slots 31 are cut across the plate 1 into which the supporting or reenforcing bars 5 are placed and fastened. This allows the use of a bar having a flat top as 32 instead of making a cross slot for each ribbon as before described. A flat topped supporting bar is desirable where it can be used as, preferably, where the ribbons are formed integral with the border 13, 14 and 15 (Fig. 14).

An alternate method of forming the ribbons in which the reenforcing bar acts as both a supporting bar and a spacer is shown in Figs. 11 and 12. In this construction a flat plate 1' of greater thickness than the depth of the deepest ribbon to be formed is used and said plate 1' is milled on the bottom to the full depth of the ribbons 3 and 4. Supporting bars 5' are then pressed on across ribbons 3 and 4 their full depth and welded. To finish the ribbons shown in Fig. 11 the top of the plate 1' is then milled off flush with the tops of bars 5', removing the amount of material indicated by the numeral 12 in Figs. 11 and 12.

While the form of the ribbons of a screen according to my invention is shown in Figs. 1 and 9 as having ribbons equally spaced and straight such screens are also formed with the ribbons on a curve as in D'Olier Patent No. 1,610,431 before referred to, and the ribbons for a screen segment A as in my Fig. 13 and segment B in Fig. 17 are formed the same as above described with the millers set to cut the ribbons on the desired curve and with corresponding slots cut in the supporting and spacing bars.

It will be understood that the reenforcing bars are arranged with any suitable spacing and either parallel as in Fig. 14 or divergent as in Fig. 17 according to the type of screen.

In Fig. 17 is shown a portion of a rotary disk screen with three segments, the center one of which is marked B. The segments are mounted on a circular frame 16, radial supporting channels 17 and channel braces 18. Said segments are shown as of sector shape with curved slots and ribbons as in my invention. Similar mounting is used for the segment C shown in Fig. 14.

The segment B of Fig. 17 is shown detailed with the curved ribbons and slots and having the longest ribbons parallel to the path of the brush 19 which rotates about a shaft 20 to sweep over the flat surface of the disk. The direction of motion of the brush 19 over the disk screen is indicated by the arrow 21 while the disk screen moves in a direction indicated by the arrow 22.

The disk screen has the usual center cone 23 and is mounted in the usual manner on rollers 24 (Fig. 18) and revolved by pin teeth 25. The screen segments in my construction, as B in Fig. 18, formed with a plate 1 and built in supporting bars 5 are of ample strength to support the filtering material 26 and sewage stream which flows onto it. 27 is an adjustable wearing ring opposite the periphery of the screen disk and 28 an adjustable filtering material ring supported by the braces 29. Outside of ring 28 and over the ring 27 is shown filtering material 30.

The complete screen segment, which may be made as detailed in Figs. 1 to 12, when finished preferably has a finishing border as shown for segment B of Fig. 17 and as described for Fig. 14 as sides 13 and ends 14 and 15.

Having thus described my invention, I claim:

1. A method of manufacturing a screen segment consisting in cutting a plurality of ribbons from a solid plate by milling one side of said plate to form a portion of each of said ribbons, inserting the formed portions of said ribbons into cross supporting bars which are slotted to conform to the formed portions of said ribbons and milling the opposite side of said plate to complete the formation of said ribbons.

2. A method of manufacturing a screen segment consisting in cutting a plurality of parallel grooves over the surface of the bottom of a single plate to form the lower parts of a plurality of equally spaced and parallel ribbons, inserting and welding supporting bars having slots to conform to the formed portion of said p'  'e across said ribbons and cutting the top of   1 plate down even with the tops of said supporting bars to complete the ribbons.

3. A method of manufacturing a screen segment from a solid plate with a plurality of ribbons consisting in cutting a plurality of equally spaced and parallel grooves over the bottom of said plate to form a portion of each of said ribbons, inserting and welding supporting bars having slots to conform to the formed portion of said plate across said ribbons, cutting the top of said plate to complete the formation of said ribbons, inserting and welding a spacer bar above each supporting bar and finishing off said spacer bar flush with the tops of said ribbons.

4. A method of manufacturing a screen segment from a solid plate with a plurality of ribbons consisting in cutting a plurality of equally spaced and parallel grooves part way through said plate, inserting and fastening supporting bars into and across said grooves and intermediate of the ends of said grooves and cutting a plurality of equally spaced and parallel grooves to finish the formation of said ribbons completely through said plate.

5. A method of manufacturing a screen segment from a solid plate with a plurality of ribbons consisting in cutting a plurality of equally spaced and parallel grooves part way through said plate from one side to form a portion of each of said ribbons, inserting at intervals supporting bars into and across said grooves and intermediate of the ends of said grooves, fastening said bars to each of said ribbons to transversely tie said ribbons together and cutting a plurality of equally spaced and parallel slots the balance of the way through said plate between its opposite side and said grooves to complete the formation of said ribbons.

6. A method of manufacturing a screen segment having a plurality of parallel ribbons formed from a single plate consisting in cutting a plurality of parallel grooves part way through from one side of said plate to form a portion of the ribbons, fastening supporting bars across said plate and cutting a plurality of parallel slots to finish the formation of the sides of said ribbons completely through said plate and to form the ends of said ribbons integral with said plate.

JOHN SCHAAF.